Aug. 7, 1962     W. J. BAKER     3,048,412
SHAFT SEAL
Filed April 27, 1959
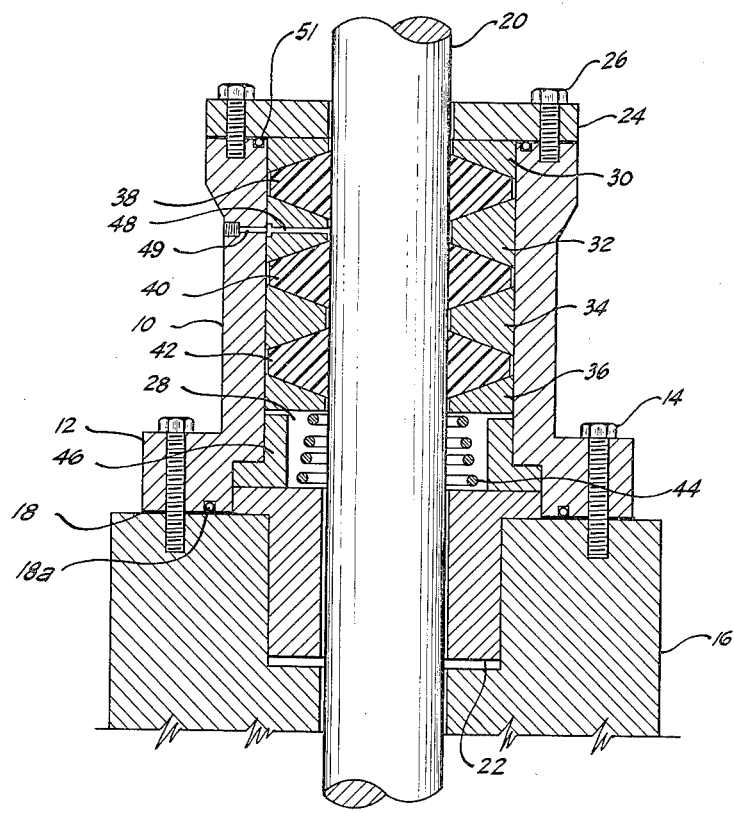
INVENTOR.
WILLIAM J. BAKER
BY Jack M. Miller
AGENT United States Patent Office 3,048,412
Patented Aug. 7, 1962

3,048,412
SHAFT SEAL
William J. Baker, Anaheim, Calif., assignor to Union Oil Company of California, Los Angeles, Calif., a corporation of California
Filed Apr. 27, 1959, Ser. No. 809,031
5 Claims. (Cl. 277—75)

This invention relates to a seal for moving shafts, and in particular concerns sealing the circumferential clearance between a reciprocating shaft and the housing through which it passes.

The transfer of energy between a low pressure system and a high pressure system, typified by a fluid pump, requires a barrier or seal to prevent fluid leakage during axial movement of the transmission shaft. Usually, the loaded end of the shaft operates under relatively severe conditions, e.g., high pressures, high temperatures, corrosive media, abrasive media or a combination of these. The shaft seals conventionally provide with fluid pumps have chevron or similarly shaped packing elements which have a number of inherent disadvantages, including excessive wear of the sealing rings, excessive shaft wear, extensive housing wear, constant readjustment to maintain the seal, and minimal sealing effectiveness during sealing ring life.

An object of this invention is to provide a shaft seal suitable for preventing fluid leakage around a reciprocating shaft, which seal is self-adjusting, long wearing, and easily maintainable.

An additional object of the invention is to provide a reciprocating shaft seal having a flexible deformable packing element which is equally effective during the pressure stroke and the return stroke of the shaft.

A further object of this invention is to provide a shaft seal which will withstand very high pressures without the development of any leakage.

I have now found that the foregoing objects and their attendant advantages can be realized in a shaft seal incorporating a plurality of resilient tapered sealing rings which cooperate with a plurality of non-resilient packing rings in such a manner that the latter are held out of contact with the shaft and the sealing rings are held out of contact with the shaft housing.

The invention will be more readily understood by reference to the accompanying drawing which forms a part of this application and in which the single FIGURE is a sectional view of a shaft sealing assembly constructed in accordance with the invention and applied to an ordinary reciprocating pump. It is to be understood that although the shaft seal of my invention is broadly applicable to sealing the space between any two movable members, it is particularly useful for reciprocably moving parts, as for example, the sealing of the reciprocating shaft of a fluid pump in connection with its movement through a stuffing box or housing conventionally used to provide fluid-tight sealing.

Referring now more particularly to the drawing, the sealing assembly there shown comprises a cylindrical housing 10 provided with an outwardly extending flange portion 12 by which the assembly is attached via threaded bolt 14 to a pump cylinder head 16 or the like. A gasket 18 and/or an O-ring 18a provides a fluid-tight seal between cylinder head 16 and housing 10. Reciprocating shaft 20, which forms a part of the pump with which the sealing assembly is employed, extends through housing 10 and is guided by bushing 22 at the inboard end of housing 10 and by end plate 24 attached to the outboard end of housing 10 via threaded bolt 26. The central openings through bushing 22 and end plate 24 are larger in diameter than shaft 20, so that an appreciable clearance, e.g., 1/16 inch, exists between the shaft and bushing 22 and end plate 24. The latter elements thus do not directly support shaft 20. Housing 10 is so dimensioned as to be spaced away from shaft 20, thereby forming an enclosed packing chamber 28 within which are disposed the various other elements hereinafter described.

Within the elongated annular packing chamber 28, non-resilient packing rings 30, 32, 34 and 36 and resilient sealing rings 38, 40, and 42 are held in compression by coil spring 44 which rests on the inner radial surface of bushing 22. Spring stop 46 is optionally provided to minimize "fluttering" of spring 44 and consequent wearing of the various internal parts. Upper packing ring 30 is provided with one flat face which bears against the lower flat face of end plate 24, and an opposed inclined face adapted to mate with the inclined face of adjacent sealing ring 38. Similarly, lower packing ring 36 is provided with one flat face against which spring 44 bears, and an opposed inclined face which mates with the inclined face of adjacent sealing element 42. The opposed faces of each of intermediate packing rings 32 and 34 are both inclined, i.e., the opposed faces are tapered inwardly from the outer periphery of the packing ring and similarly mate with the inclined faces of the adjacent sealing rings. The packing rings are dimensioned so as to fit closely within housing 10, but the central opening in each is suitably about 0.030 inch larger in diameter than shaft 20. The packing rings thus do not bear against shaft 20. Packing ring 32 is shown provided with a lubricant port 48 extending between its longitudinal faces and in register with a similar port 49 extending laterally through housing 10. O-ring seal 51 between end closure 24 and housing 10 prevents excessive lubricant leakage. It will be apparent that such lubrication means can be provided for any or all of the packing rings.

Resilient sealing rings 38, 40, and 42 are so shaped that their thickness decreases with increasing radius, i.e., their longitudinal cross-sections are trapezoidal or, more explicitly, their opposed faces are tapered outwardly from their inner periphery. The angle formed by extension of their opposed faces is suitably between about 30° and about 60°. The central opening through each of the sealing rings is normally about 0.002 inch larger in diameter than shaft 20, and the outside diameter of each sealing ring is normally about 0.030 inch less than the inside diameter of housing 10. The sealing rings thus do not normally bear against housing 10. The sealing rings are held in spaced relationship within packing chamber 28 by the interpositioning therebetween of the non-resilient packing rings described above. As will be apparent, the force exerted by spring 44 against lower packing ring 36 maintains the stack of packing rings and sealing rings under compression, with the inclined faces of the packing rings bearing against the complementary faces of the sealing rings so that the latter, being resilient, are deformed inwardly to form a tight seal with shaft 20.

Resilient sealing rings 38, 40 and 42 can be formed from any suitable flexible deformable material. A preferred material of construction is the polytetrafluoroethylene polymer, sold under the trademark "Teflon." This plastic packing material, either alone or in combination with other materials, e.g., ceramic fibers, shows remarkable corrosion and solvent resistance, heat resistance, inertness with respect to most lubricants, toughness coupled with flexibility, and a very low coefficient of friction with the materials, such as steel, ceramic, and ceramic coated metals, which are commonly used in shaft construction. The ceramic fiber-Teflon compounded packing material has been found to hold up particularly well under severe operating conditions.

The number of resilient sealing elements employed will vary according to service requirements. Thus, for low pressure service, a single sealing element will be sufficient, whereas very high pressure service may require more than the three shown in the drawing. Other modifications and adaptations of the present device will occur to those skilled in the art, and the invention is limited only as set forth in the following claims.

I claim:
1. A shaft sealing assembly comprising, in combination with a reciprocating shaft: a cylindrical housing surrounding said shaft and provided at its opposite ends with end closures through which said shaft extends, the inside diameter of said housing being substantially larger than the diameter of said shaft whereby said housing and end closures enclose an elongated annular chamber surrounding said shaft; at least two rigid non-resilient packing rings surrounding said shaft and spaced axially from each other, each of said packing rings having a packing ring outer periphery abutting against said housing and tapering inwardly from said packing ring outer periphery to a packing ring inner periphery spaced radially outwardly from said shaft, said packing ring inner periphery having a shorter axial length than said packing ring outer periphery; a resilient sealing ring fitting closely around said shaft and interposed between and in direct contact with adjacent spaced packing rings, said sealing ring having opposed radial faces tapered uniformly outwardly from a sealing ring inner periphery to a sealing ring outer periphery to mate with said adjacent packing rings, said sealing ring outer periphery being spaced radially inwardly from said housing and said sealing ring outer periphery having a shorter axial length than said sealing ring inner periphery; and compressive means positioned between at least one of said end closures and the packing ring adjacent thereto so as to apply a compressive force on said spaced packing rings and said interposed sealing ring to force said sealing ring inner periphery tightly against said shaft.

2. A sealing assembly according to claim 1 wherein said compressive means is a coil spring surrounding said shaft.

3. A sealing assembly according to claim 1 wherein at least one of said non-resilient packing rings is provided with a fluid conduit extending radially therethrough and in fluid communication with a fluid conduit extending radially through said housing, said fluid conduits providing a path for lubricant to reach the surface of said shaft enclosed in said housing.

4. A sealing assembly according to claim 1 including means positioned within said chamber for limiting the longitudinal movement of said packing rings and said sealing ring to less than the maximum longitudinal movement allowed by said compressive means.

5. A sealing assembly according to claim 1 including at least one other of said packing rings and at least one other of said sealing rings, each packing ring being separated from the adjacent packing ring by a sealing ring.

References Cited in the file of this patent

UNITED STATES PATENTS

| | | |
|---|---|---|
| 503,723 | Longstreth | Aug. 22, 1893 |
| 1,350,553 | Mack | Aug. 24, 1920 |
| 1,787,020 | Sautter | Dec. 30, 1930 |

FOREIGN PATENTS

| | | |
|---|---|---|
| 406,937 | Germany | Dec. 5, 1924 |